US008688571B2

(12) United States Patent
Carroll et al.

(10) Patent No.: US 8,688,571 B2
(45) Date of Patent: Apr. 1, 2014

(54) MOBILE PLATFORM FOR EVENT REGISTRATION

(75) Inventors: Steven Carroll, San Diego, CA (US); Peter De Tagyos, San Diego, CA (US); Josh Schlesser, La Jolla, CA (US)

(73) Assignee: The Active Network, Inc., San Diego, CA (US)

( * ) Notice: Subject to any disclaimer, the term of this patent is extended or adjusted under 35 U.S.C. 154(b) by 205 days.

(21) Appl. No.: 13/297,123

(22) Filed: Nov. 15, 2011

(65) Prior Publication Data

US 2013/0124398 A1    May 16, 2013

(51) Int. Cl.
*G06Q 10/00* (2012.01)
*G06Q 99/00* (2006.01)

(52) U.S. Cl.
CPC ................................ *G06Q 99/00* (2013.01)
USPC ................................... 705/39; 705/5

(58) Field of Classification Search
CPC ....................................................... G06Q 99/00
USPC ............................................................. 705/5
See application file for complete search history.

(56) References Cited

U.S. PATENT DOCUMENTS

2002/0138325 A1*  9/2002  Mashimo et al. ................. 705/8
2004/0044621 A1*  3/2004  Huang et al. .................... 705/40
2005/0209914 A1*  9/2005  Nguyen et al. .................. 705/14
2008/0007389 A1    1/2008  Shidou et al.
2008/0172339 A1    7/2008  Cato et al.
2009/0177503 A1*  7/2009  Kawano et al. .................. 705/5

OTHER PUBLICATIONS

Secretary; "Mobile Registration for Penang Bridge Internet Marathon"; Online: http://www.penangmarathon.gov.my ; Sep. 29, 2010.
"Telesens Debuts Mobile Registration for New York Marathon"; MobileMarketing Magazine, UK, Jan. 2011.

* cited by examiner

*Primary Examiner* — William Rankins
(74) *Attorney, Agent, or Firm* — Stetina Brunda Garred & Brucker (57) ABSTRACT

Method and systems of registering participants for an event at an event site are disclosed. Identification data specific to a participant encoded on a first token object is read with a mobile computing device. A query is generated from the mobile computing device to a remote event registration system for prior registration data based upon at least a subset of the received identification data. The prior registration data is received on the mobile computing device. A first subset of the prior registration data is transmitted to a local event registration system, and a payment success indicator is received upon successful payment processing. Registrant identification data is generated by the local event registration system in response to recording the first subset of the prior registration data and the payment success indicator.

24 Claims, 6 Drawing Sheets

SUNSHINE MARATHON
ACTIVE WORKS
ONSITE

✓ REGISTRATION SUCCESSFUL!

REGISTRANT
JOE RUNNER

CONFIRMATION NUMBER
R-1234

[ ASSIGN BIB ] [ FINISHED ]

ACTIVE WORKS
ONSITE

SUNSHINE MARATHON

BIB NUMBER
[ 1234 ]

63

[ ASSIGN BIB ]

SUNSHINE MARATHON
ACTIVE WORKS
ONSITE

✓ REGISTRATION SUCCESSFUL!

REGISTRANT
JOE RUNNER

PARTICIPANT
1234

[ FINISHED ]

66

MOBILE PLATFORM FOR EVENT REGISTRATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to data processing systems and methods, and more particularly to mobile data processing platforms for managing mass on-site event registrations for endurance races, trade shows, and so forth.

2. Related Art

Hosted events involving a large gathering of participants are numerous and varied, catering to different needs, interests, and activities. Business and professional conventions, trade shows, seminars, and the like bring together individuals who are involved in a particular industry or industry segment to discuss and showcase matters pertinent thereto. Such conventions can be centered on a common interest such as science fiction, automobiles, the outdoors, and so forth, with vendor displays, keynote speakers, and breakaway sessions that cater to the interest being a common feature. Events involving many participants are not limited to such types of conventions, however, and may be directed to a common activity or goal. For instance, running races, bicycle races, and other such athletic events are also popular nationwide.

In each of these mass participant events, individual participants must be registered and tracked throughout the event for different purposes. In the business convention example, the organization of convention space may be made according to registration information. In the running race example, each of the runners may be identified individually for timing, placement, and awarding purposes.

Currently, the procedure for registering for these events involves accessing an event website and filling out a form. Payment for registration is also handled by the website in a separate step of the transaction. The participants' registration information is transferred to and coordinated with event-specific computer systems. In sporting events such as endurance races, these systems perform timing and other logging systems. This process of transferring data from the registration site to the event-specific system can be time-consuming because of the lack of interoperability. Thus, event hosts typically enforce a registration deadline well before the day of the event.

With the large number of participants, there are invariably those who neglect to register before the submission deadline. As an incentive, early registrants may incur a lower fee than later registrants. In most cases, the hosts are able to register the participant at the event itself, but this usually requires a cumbersome manual data entry process that only a few select staff are trained to perform. These are usually the most experienced and senior who have knowledge of the event-specific systems. Time spent by such staff to register later participants, however, could be better spent handling more critical event-day issues. Accordingly, there is a need in the art for the improved management of mass on-site, event-day registrations.

BRIEF SUMMARY

An embodiment of the present disclosure contemplates a method of registering participants for an event at an event site. The method may involve reading identification data specific to a participant encoded on a first token object with a mobile computing device that includes an integrated token reading device. There may also include a step of generating a query from the mobile computing device to a remote event registration system for prior registration data. This query may be based upon at least a subset of the received identification data. Thereafter, the method may include a step of receiving the prior registration data on the mobile computing device. The method may include transmitting a first subset of the prior registration data to a local event registration system. Thereafter, the method may include receiving a payment success indicator. The method may include receiving registrant identification data generated by the local event registration system following the recordation of the first subset of the prior registration data thereon.

Another embodiment contemplates a system for on-site registration of participants at an event. The system may include a participant registrar system for management of the event, as well as a past participant database including prior registration data of at least one of the participants. There may also be a mobile computing device in communication with a payment processing system, the participant registrar system, and the past participant database. The mobile computing device may include a participant token reader for collecting identification data specific to the participant that is encoded on a first token object therefrom. The mobile computing device may also have a registration interface module for querying the past participant database with the inputted identification data to retrieve corresponding prior registration data of the participant. Further, there may be a participant registrar module for transferring the retrieved prior registration data of the participant to the participant registrar system. The mobile computing device may also include a payment module that is linkable to the payment processing system. A payment confirmation may be received by the payment module from the payment processing system upon payment success. The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Various methods of registering participants for an event and systems for the registration of participants of an event are disclosed in accordance with various embodiments of the present disclosure. The methods and systems are contemplated to streamline on-site, event day registrations. The detailed description set forth below in connection with the appended drawings is intended as a description of those embodiments and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Figure 1:
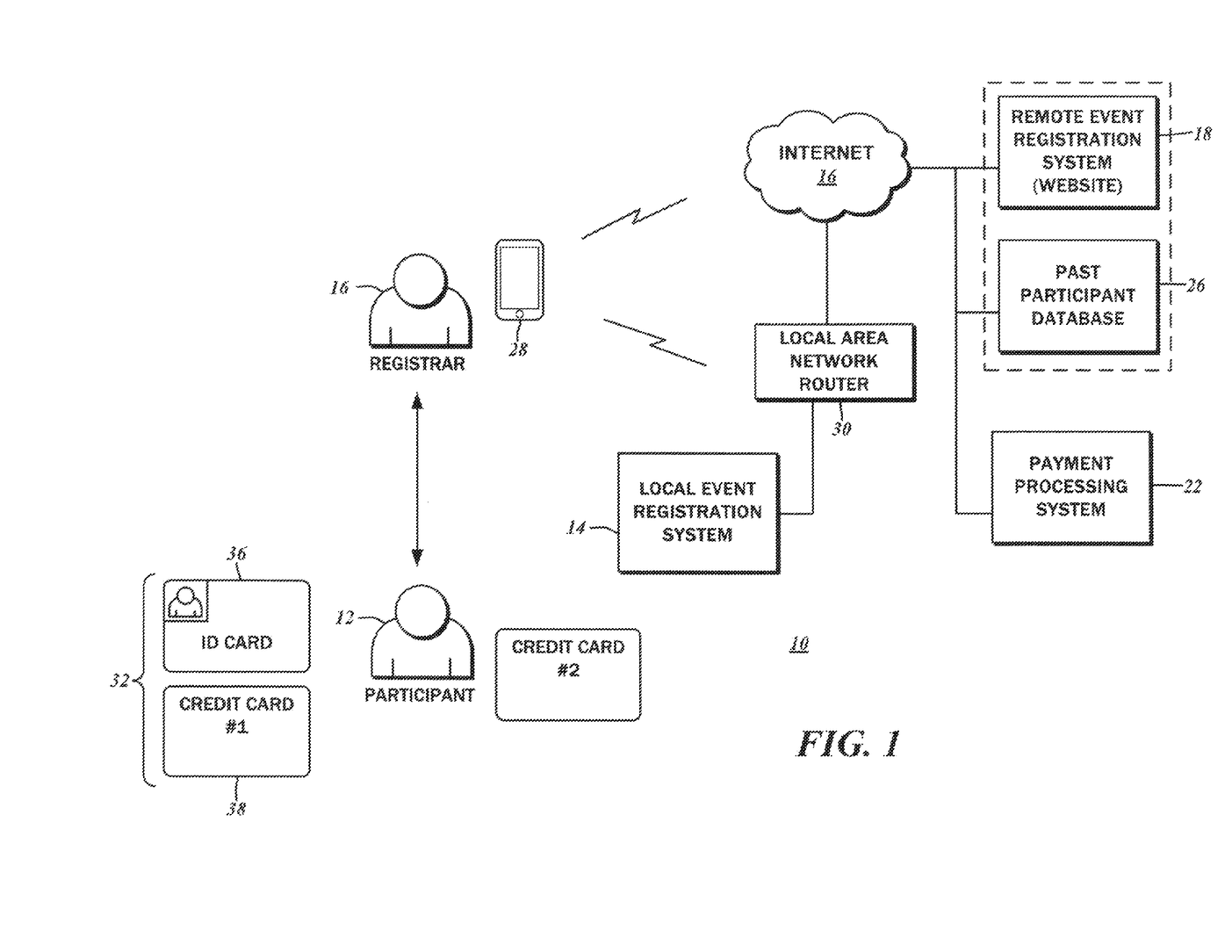
FIG. 1 is a diagram illustrating an environment in which various embodiments of the present disclosure may be implemented.

The block diagram of FIG. 1 depicts an environment 10 of a mass participant event. The various features of the present disclosure will be discussed in the context of this mass participant event, which, in the disclosed example, is a running race. It will be recognized by those having ordinary skill in the art that such features may be applicable to other types of athletic events, in addition to non-athletic events such as conventions, trade shows, and the like. Accordingly, the particular mass participant event referenced herein is by way of example only and not of limitation. Furthermore, it will be recognized that those aspects that specifically pertain to the running race may be modified or adjusted to meet the requirements of such other contexts.

The running race may have many participants numbering in the hundreds, if not thousands. Each of these participants 12 or runners must be tracked individually for various purposes, chief amongst these being timing and placement relative to the other runners, in light of the race being a competitive event. Besides the runners' names, other personal information is recorded for categorization purposes, including date of birth and gender. In some races, the standing or placement of the runners may be grouped according to age group, gender, or other classifications. Contact information in the form of the runner's e-mail address, mailing address, and telephone numbers may also be maintained so that performance results, future race information and the like may be provided. Considering that running a race is a physically demanding activity, there is a possibility that a health emergency may arise during the event. Therefore, emergency contact information may be maintained.

The large volume of data of the participants 12 is maintained on a local event registration system 14, which may also be referred to as a participant registrar system. As the name suggests, the local event registration system 14 manages all of the participant registrations of the race, and may also cooperate with other subsystems such as timers. The local event registration system 14 may be a conventional computer system with a central processing unit, memory, various input and output devices such as keyboards, mice, and display units. Different variations of the computer system including desktops, laptops, tablets, smart phones and the like may be substituted. Computer-executable software instructions of a participant management application may be stored on the local event registration system 14.

The participant registration data is typically submitted to a registrar 16 well before the day of the event, and may be transferred to the local event registration system 14 by one of several modalities. In some instances, the participant registration data may be on a printed document that is physically mailed to the registrar 16. Thereafter, the information is manually entered into the local event registration system 14. Alternatively, the registrar may host a remote event registration system or website 18 connected to the Internet 20. Using a web browser application on a client computer system, the participant 12 may retrieve from the website 18 a form requesting the participant registration data. Upon entering the requested information, it can be transmitted and stored on the website 18. The stored participant registration data may then be converted to a format readable by the local event registration system 14.

Typically, running races and other such mass participant events have substantial administrative costs. The event host may seek donations, sponsorships in exchange for advertising, booth space, and the like, but this may not be sufficient to offset the costs. Thus, the participants themselves can be charged a registration fee. Where the participant submits the registration form by mail, the form may include a field for credit card information, or may be accompanied by a personal check. The registrar 16 deposits the check or processes the credit card charge and transfers the funds to a designated account for the event via a point of sale terminal, and records the status of the participant as paid on the local event registration system 14. When registering through the website 18, payment information may be entered into separate fields of the aforementioned form, and transmitted to a payment processing system 22 for completion. Upon receiving a confirmation that the funds were successfully transferred, the transaction may continue with the participant registration data indicating the same.

As mentioned briefly in the background of the present disclosure, not all participants submit timely registrations, regardless of the various incentives that may be offered. Accordingly, another possible modality by which participants may be registered closer to or on the date of the event is contemplated by the present disclosure. In further detail shown in the block diagram of FIG. 2, an on-site registration system 24 includes the participant registrar system 15 that is specific to the management of the event as discussed above. The website 18, through which earlier, timely registrations are submitted to the registrar 16 by the participant 12, also stores registration data received in connection with prior events. Although the retrieval functionality of the prior registrations may be implemented by the website 18, for purposes of this disclosure will be separately referenced as a past participant database 26.

Figure 2:
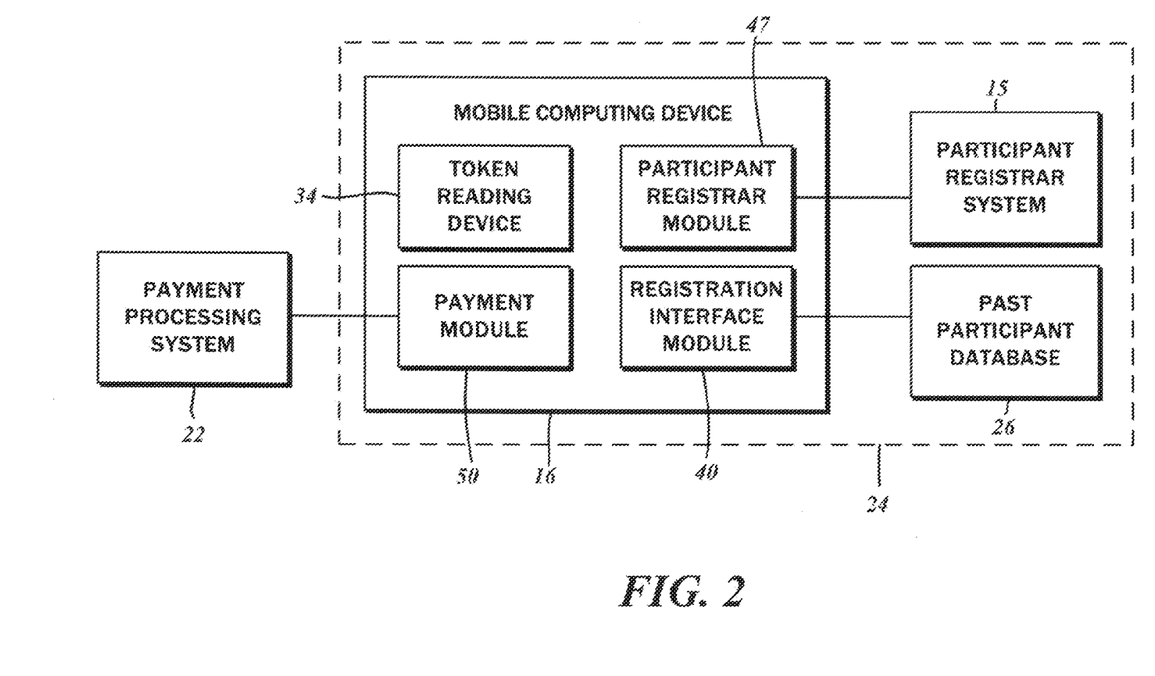
FIG. 2 is a block diagram of an on-site registration system.

The on-site registration system 24 also includes a mobile computing device 28 that is in communication with the payment processing system 22, the participant registrar system 15, and the past participant database 26, among others. The mobile computing device 28 is understood to be a conventional device with a processor to execute pre-programmed instructions stored in a memory and output the results on a display. Inputs are provided through an integrated touch sensor device, though other conventional modalities such as keyboards and mice may also be utilized. In order to communicate with the aforementioned systems, the mobile computing device 28 includes a wireless data transfer module such as a WiFi, Bluetooth, or Zigbee transceiver that communicates with a corresponding network routing device 30 that is deployed in the environment 10. The network routing device 30 may also be connected to the Internet 20, such that devices within the local area network deployed at the event may communicate with, for example, the website 18. Thus, through the network routing device 30, the mobile computing device 28 may communicate with the website 18 and the past participant database 26. Alternatively, the mobile computing device 28 may have an independent data communications link to the Internet 20 through, for example, the cellular telephone network. While a specific network topology that may be deployed for the event in the environment 10, it will be recognized by those having ordinary skill in the art that this is by way of example only and not of limitation. Any other suitable arrangement of the various systems and networks may be substituted without departing from the scope of the present disclosure.

Figure 3:
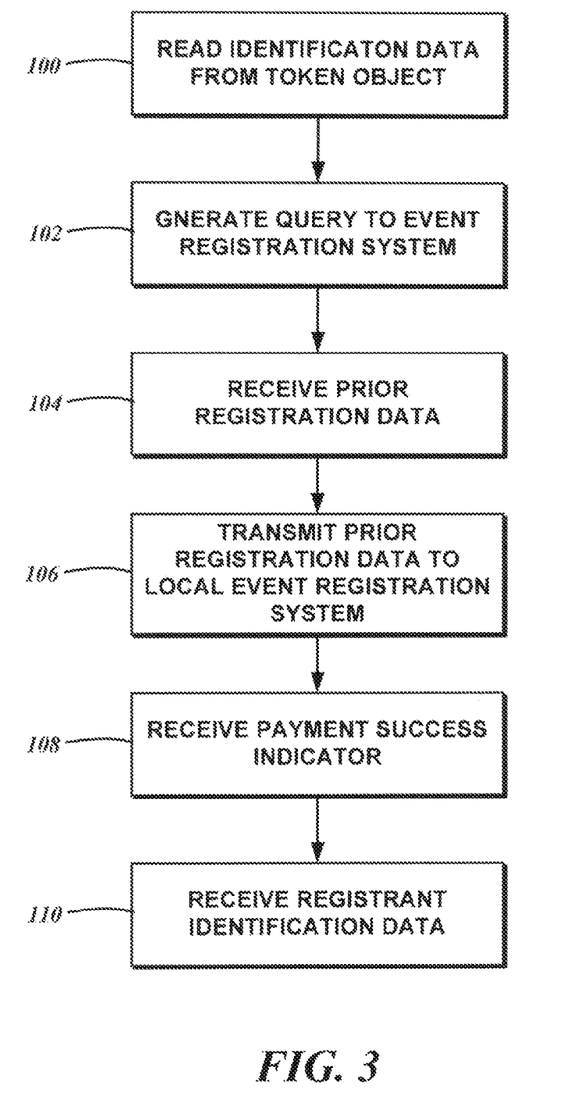
FIG. 3 is a flowchart detailing one method of registering participants for an event at an event site.

With additional reference to the flowchart of FIG. 3, the details of the method for registering the participants 12 utilizing the on-site registration system 24 will now be described. It is contemplated that the method be implemented as machine-readable instructions that are executed by the mobile computing device 28. Generally, the on-site registration system 24 and the methods for registering the participants are envisioned to facilitate payment and the quick collection of the information used by the local event registration system 14. The method begins with a step 100 of reading identification data that is specific to the participant 12 encoded on a first token object 32.

As shown in FIG. 2, the mobile computing device 28 includes an integrated token reading device 34, also referred to as a participant token reader, for this purpose. The token object 32 may be any item possessed by the participant 12 that has unique identifying information encoded thereon. The most widely possessed token is a government-issued identification card such as a driver's license 36. The face of the card typically includes a photograph, full name, gender, date of birth, mailing address, and other such data. The back of the card may have an embedded magnetic strip that is encoded with the same data. To retrieve the encoded data on the magnetic strip, the token reading device 34 is understood to be a magnetic strip reader that is connected to or integrated with the mobile computing device 28. The magnetic strip on the driver's license 36 need not be the only type of card that is readable by the token reading device 34. As another example, a credit card 38 is also understood to have magnetic strips that are encoded with information specific to its legitimate possessor. Along these lines, debit cards and other stored value cards may be substituted.

Besides token objects 32 with magnetic strips, those with alternative encoding modalities may be substituted. For example, the token object 32 in the form of a card may be imprinted with a bar code, a Q-code, or any other image pattern-based encoding. In such implementations, the token reading device 34 may simply be an on-board camera integrated with the mobile computing device 28. The camera can capture an image of the bar code, and based upon conventional decoding techniques, extract the encoded information therefrom. Alternatively, the token reading device 34 may be a laser scanner that directly reads the information from the bar code.

The method continues with a step 102 of generating a query to the remote event registration system or website 18 from the mobile computing device 28. In further detail, the mobile computing device 28 includes a registration interface module 40 that may generate the query. It is contemplated that the query is based upon at least a subset of the received identification data from the first token object, for example, the name and date of birth of the participant. To the extent the participant 12 has registered for previous events in which the remote event registration system or website 18 was utilized, prior registration data that may or may not be encoded on the first token object 32, is requested. Therefore, there is no longer a requirement for the participant 12 to re-submit this information when registering on-site.

Figure 4A:
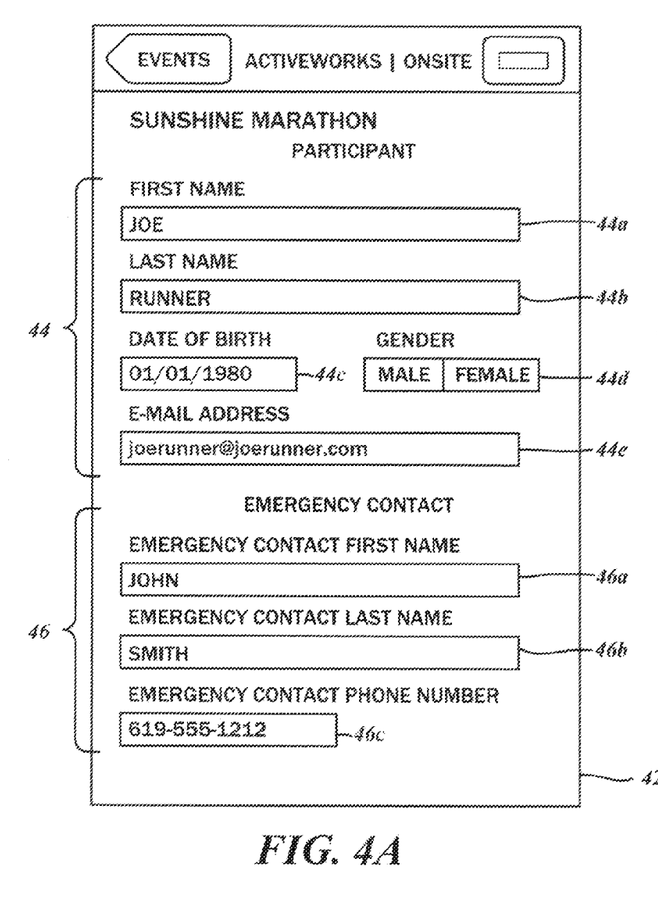
FIG. 4A is first section of an example registrant management user interface generated on a mobile computing device of the one-site registration system with fields for inputting or populated with participant information.
Figure 4B:
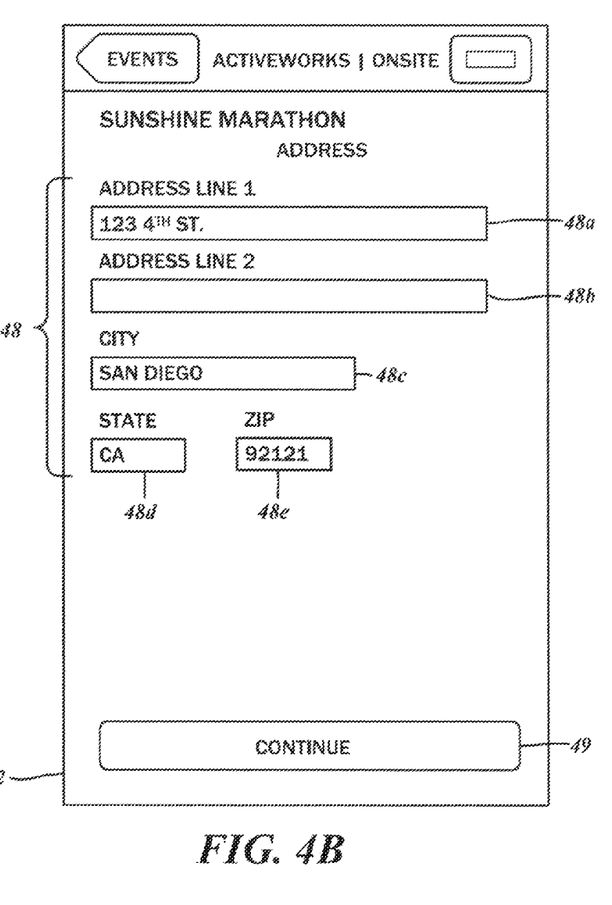
FIG. 4B is a second section of the example user interface shown in FIG. 4A.

After generating the query, the method includes a step 104 of receiving the prior registration data on the mobile computing device 28. With reference to FIG. 4A and FIG. 4B, the registration interface module 40 may display a registrant management user interface 42 on the mobile computing device that mimics a form filled out with the registration information from the participant 12. The registrant management user interface 42 is visually segregated into multiple sections. There is a participant information section 44 that includes a first name field 44a, a last name field 44b, a date of birth field 44c, a gender selector field 44d, and an e-mail contact field 44e. Further, there is an emergency contact section 46 that includes a first name field 46a, a last name field 46b, and a telephone number field 46c. Additionally, there is an address section 48 with a first address line field 48a, a second address line field 48b, a city field 48c, a state field 48d, and a Zip code field 48e. It will be recognized that other fields may also be included in the form and populated with data from the past participant database 26. It is expressly contemplated that the form fields be receptive to keyed input from the registrar 16, though where the prior registration data is retrieved from the past participant database 26, these fields are understood to be populated automatically.

After the registrar 16 and/or the participant 12 confirms the validity of the prior registration data as displayed on the mobile computing device 28, the method includes a step 106 of transmitting a first subset of the same to the local event registration system 14. Various embodiments of the present disclosure contemplate a participant registrar module 47 that performs this function. The registrant management user interface 42 has a continue or submit button 49 to begin the step 106.

As indicated above, the processing of the registration for the event also involves accepting payment for participation in the event. The present disclosure contemplates a number of different payment processing functions, each of which involves a transaction with the payment processing system 22. The mobile computing device 28 has a payment module 50 that interfaces with the payment processing system 22. In one contemplated embodiment, the first token object 32 is the credit card 38 or other like form of payment. When the identification data is being read, so is the payment data. Alternatively, a second token object 33 that is specifically a credit card or other payment device may be provided to the registrar 16 and read, decoded, and processed in the same manner as the aforementioned first token object 32. In either case, the payment data is transmitted to the payment processing system 22, which issues a charge against the account corresponding to the credit card 38, and transfers funds to a designated account of the registrar 16. The ways in which credit cards and debit cards are processed are well known in the art, and thus the details thereof will be omitted herein.

In another embodiment, the payment data is stored in the past participant database 26 along with the remainder of the prior registration data. When the prior registration data is queried and retrieved, the earlier utilized payment data may also retrieved. In order to safeguard the security of the payment data, it may be encrypted during transmission from the past participant database.

Figure 5:
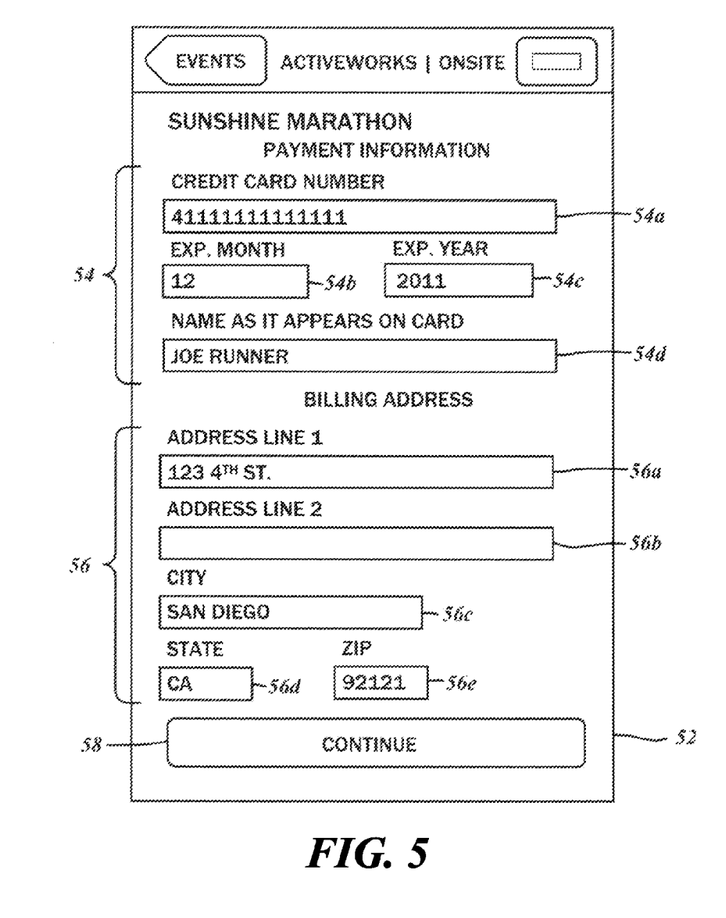
FIG. 5 is a an example payment user interface generated on the mobile computing device.

Before the payment data is submitted to the payment processing system 22, as shown in FIG. 5, the fields of a payment user interface 52 generated on the mobile computing device 28 is populated therewith. Specifically, the payment user interface 52 is segregated into an account section 54 with an account number field 54a, an expiration month field 54b, an expiration year field 54c, and an accountholder name field 54d. In addition to such account information, processing typically requires additional accountholder information including the billing address, so the payment user interface 52 also includes a billing address section 56 with a first address line field 56a, a second address line field 56b, a city field 56c, a state field 56d, and a Zip code field 56e.

After the data populated in the payment user interface 52 is confirmed by the registrar 16 and/or the participant 12, another continue or submit button 58 is activated to transmit the payment information to the payment processing system 22. If the payment is processed successfully, the method continues with a step 108 of receiving a payment success indicator from the payment processing system 22. In response to a receipt of the payment success indicator, the pertinent field or fields in the local event registration system 14 may be modified.

Figure 6:
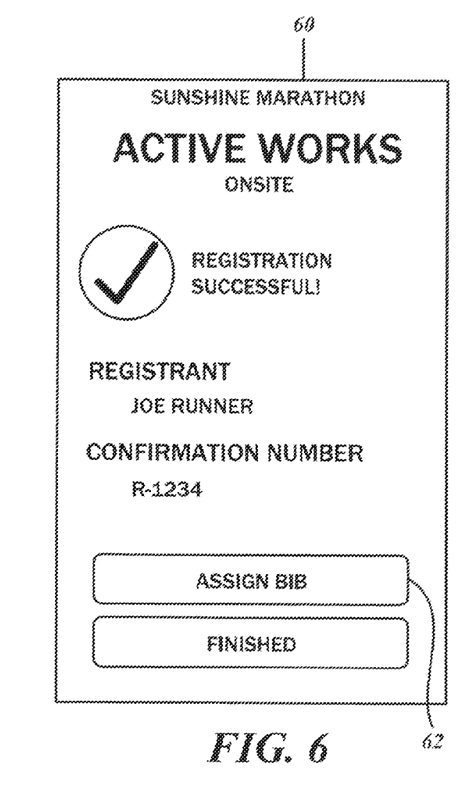
FIG. 6 is an example registration finalization user interface generated on the mobile computing device following the successful registration and payment of the participant.

With the registration data submitted and the payment completed, the method continues with a step 110 of receiving registrant identification data that is generated by the local event registration system 14. As shown in FIG. 6, a confirmation user interface 60 indicating a successful registration is displayed on the mobile computing device 28, and shows the name of the participant, as well as the registrant identification data or confirmation number. In the illustrated example, the confirmation number is "R-1234."

Figure 7:
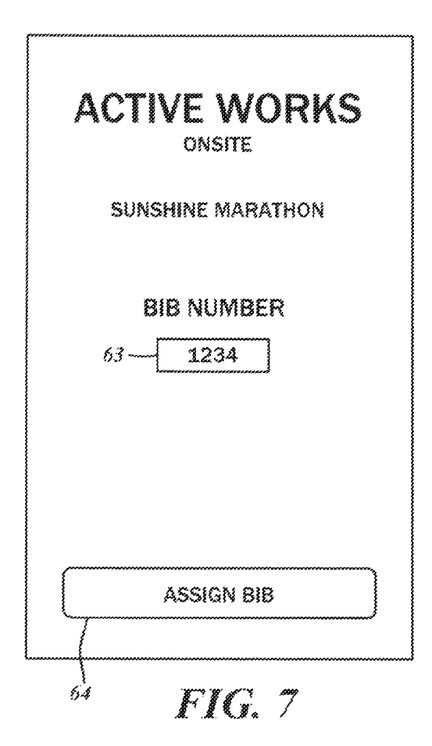
FIG. 7 is an example participant identifier assignment user interface generated on the mobile computing device.
Figure 8:
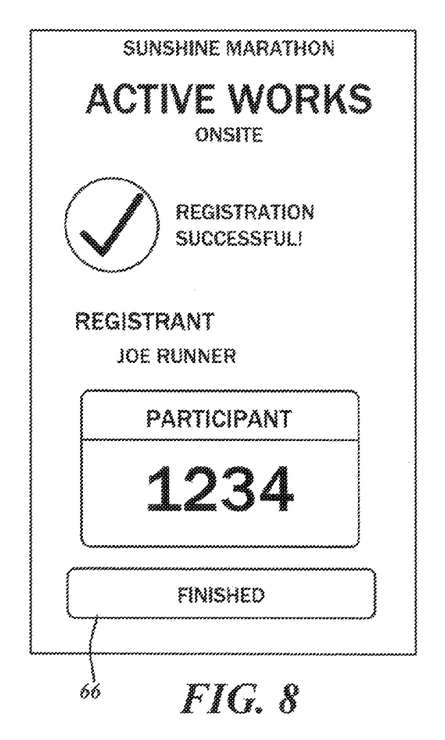
FIG. 8 is an example confirmation user interface generated on the mobile computing device in accordance with one embodiment of the present disclosure.

There is contemplated an additional step following the confirmation of a successful registration that involves assigning an arbitrary participant identification number from the mobile computing device. In the context of the running race, each runner is assigned a bib number. The registrar 16 has numerically sequenced bibs that may be unorganized and out of order, and randomly selects one to assign to the participant 12. From the confirmation user interface 60 a button 62 may be activated to assign the bib number. Referring now to FIG. 7, in a form field 62, the selected bib number, which in the example shown is "1234", is entered. Various alternative modalities for retrieving the bib number are contemplated, including scanning bar codes on the bibs, digitizing images of the numbers and recognizing the characters, and so forth. Selecting the assign button 64 then stores the participant identification number, i.e., the bib number, on the local event registration system 14, and linked to the earlier submitted registrant identification data. Finally, a confirmation screen as shown in FIG. 8 may be generated, including the name of the participant 12 and the assigned bib number. Selecting the finish button 66 restarts the aforementioned method for a new participant 12.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of registering participants for an event at an event site, the method comprising:
   reading identification data specific to a participant encoded on a first token object therefrom with a mobile computing device including an integrated token reading device;
   generating a query from the mobile computing device to a remote event registration system for prior registration data based upon at least a subset of the received identification data;
   receiving the prior registration data on the mobile computing device;
   transmitting a first subset of the prior registration data to a local event registration system;
   generating a payment request with payment data to a remote payment processing system;
   receiving a payment success indicator following an affirmative completion of the payment request; and
   receiving registrant identification data generated by the local event registration system following the recordation of the first subset of the prior registration data and the payment success indicator thereon.

2. The method of claim 1, wherein the first token object includes the payment data specific to the participant encoded thereon.

3. The method of claim 2, further comprising the step:
   reading the payment data from the first token object on the mobile computing device with the integrated token reading device.

4. The method of claim 2, wherein:
   the first token object is a payment card having a magnetic strip, the payment data and the identification data being magnetically encoded thereon;
   the integrated token reading device is a magnetic strip reader.

5. The method of claim 4, wherein the first token object is selected from a group consisting of: a credit card, a debit card, and a stored value card.

6. The method of claim 2, wherein:
   the first token object is a card including a bar code representative of an identifier associated to the identification data and the payment data.

7. The method of claim 6, wherein the integrated token reading device is an imaging sensor for capturing an image of the bar code.

8. The method of claim 6, wherein the integrated token reading device is a laser scanner for reading the identifier represented by the bar code.

9. The method of claim 1, wherein the prior registration data includes the payment data corresponding to the received identification data read from the first token object.

10. The method of claim 1, wherein the first token object is an identification card.

11. The method of claim 10, further comprising the step:
    reading the payment data from a second token object with the integrated token reading device of the mobile computing device.

12. The method of claim 11, wherein:
    the second token object is a payment card having a magnetic strip, the payment data being magnetically encoded thereon;
    the integrated token reading device is a magnetic strip reader.

13. The method of claim 12, wherein the second token object is selected from a group consisting of: a credit card, a debit card, and a stored value card.

14. The method of claim 1, wherein a second subset of the received prior registration data includes the payment data.

15. The method of claim 14, wherein the second subset of the received prior registration data is encrypted.

16. The method of claim 1, further comprising:
displaying the registrant identification data on the mobile computing device.

17. The method of claim 1, further comprising:
assigning an arbitrary participant identification number from the mobile computing device; and
transmitting the participant identification number to the local event registration system for storage thereon in linked relationship to the registrant identification data.

18. The method of claim 1, further comprising:
displaying on the mobile computing device in editable fields of a form a subset of the received prior registration data.

19. A system for on-site registration of participants at an event, the system comprising:
a participant registrar system for management of the event;
a past participant database including prior registration data of at least one of the participants;
a mobile computing device in communication with a payment processing system, the participant registrar system, and the past participant database, the mobile computing device including:
a participant token reader for collecting identification data specific to the participant encoded on a first token object therefrom;
a registration interface module for querying the past participant database with the inputted identification data to retrieve corresponding prior registration data of the participant for transfer to the participant registrar system;
a participant registrar module for transferring the retrieved prior registration data of the participant to the participant registrar system; and
a payment module linkable to the payment processing system, a payment confirmation being received by the payment module from the payment processing system upon successful payment processing.

20. The system of claim 19, wherein:
the participant token is a card including a magnetic strip with the identification data encoded thereon; and
the participant token reader is a magnetic strip reader.

21. The system of claim 20, wherein the first token object is selected from a group consisting of: an identification card, a credit card, a debit card, and a stored value card.

22. The system of claim 19, wherein the payment module transmits payment data derived from the prior registration data to the payment processing system.

23. The system of claim 19, wherein the payment module transmits payment data received from the first token object.

24. An article of manufacture comprising a non-transitory program storage medium readable by a data processing apparatus, the medium tangibly embodying one or more programs of instructions executable by the data processing apparatus to perform a method of registering participants for an event at an event site, the method comprising:
reading identification data specific to a participant encoded on a first token object therefrom with a mobile computing device including an integrated token reading device;
generating a query from the mobile computing device to the remote event registration system for prior registration data based upon at least a subset of the received identification data;
receiving the prior registration data on the mobile computing device;
generating a payment request to a remote payment processing system;
transmitting a first subset of the prior registration data to a local event registration system in response to receipt of a payment success indicator from the remote payment processing system; and
receiving registrant identification data generated by the local event registration system following the recordation of the first subset of the prior registration data thereon.

* * * * *